United States Patent [19]

Robb

[11] Patent Number: 4,682,283
[45] Date of Patent: Jul. 21, 1987

[54] ADDRESS RANGE COMPARISON SYSTEM USING MULTIPLEXER FOR DETECTION OF RANGE IDENTIFIER BITS STORED IN DEDICATED RAM'S

[75] Inventor: James R. Robb, Marion, Iowa

[73] Assignee: Rockwell International Corporation, El Segundo, Calif.

[21] Appl. No.: 827,495

[22] Filed: Feb. 6, 1986

[51] Int. Cl.[4] ............................................. G06F 12/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,815,103 | 6/1974 | Holtey et al. | 364/200 |
| 3,914,747 | 10/1975 | Barnes et al. | 364/200 |
| 4,025,903 | 5/1977 | Kaufman et al. | 364/200 |
| 4,030,080 | 6/1977 | Burkett et al. | 364/900 |
| 4,037,214 | 7/1977 | Birney et al. | 364/200 |
| 4,038,645 | 7/1977 | Birney et al. | 364/200 |
| 4,204,250 | 5/1980 | Getson, Jr. et al. | 364/200 |
| 4,234,934 | 11/1980 | Thorsrud | 364/900 |
| 4,250,560 | 2/1981 | Dethloff et al. | 364/900 |
| 4,276,594 | 6/1981 | Morley | 364/200 |
| 4,303,993 | 12/1981 | Panepinto et al. | 365/230 |
| 4,319,323 | 3/1982 | Ermolovich | 364/200 |
| 4,321,667 | 3/1982 | Robbins | 364/200 |
| 4,355,355 | 10/1982 | Butwell et al. | 364/200 |
| 4,407,016 | 9/1983 | Bayliss et al. | 364/200 |
| 4,468,729 | 8/1984 | Schwartz | 364/200 |
| 4,495,571 | 1/1985 | Staplin, Jr. et al. | 364/200 |
| 4,503,491 | 3/1985 | Lushtak et al. | 364/200 |
| 4,507,730 | 3/1985 | Johnson | 364/200 |
| 4,511,961 | 4/1985 | Penton | 364/200 |
| 4,527,237 | 7/1985 | Frieder et al. | 364/200 |
| 4,562,535 | 12/1985 | Vincent et al. | 364/200 |

OTHER PUBLICATIONS

C. J. Sippl et al, Computer Dictionary & Handbook, (Howard W. Sams & Co., Inc., Indianapolis, Ind.), p. 6.
M. H. Welk, Standard Dictionary of Computers & Information Processing, (Hayden Book Co., Inc., New York), p. 13.

Primary Examiner—Archie E. Williams, Jr.
Assistant Examiner—Florin Munteanu
Attorney, Agent, or Firm—Robert C. Mayes; George A. Montanye; H. Fredrick Hamann

[57] ABSTRACT

A digital comparison system and technique enables an easy determination of the digital range within which digital addresses or data may fall or be selected. In one embodiment, the entire memory or address space is divided into a predetermined number of sections, and each section's location in memory is defined by a predetermined first number of digits of the address. Likewise each address within a section is defined by a second predetermined number of digits of the address. A digital identifier is assigned to each section to define the position of a section with respect to a desired range. Digital identifiers are also assigned to each address within a section to fix the end points within each section. The outputs from memory devices storing the identifiers are coupled through a multiplexer which allows the position of a selected address to be identified as inside, outside, or an end point of a predetermined range. When the selected address is an end point, the multiplexer provides an indication signifying that the end point is either the upper or lower end point of the range. The system allows an easy determination of any range by a simple adjustment of the identifiers coded in memory devices.

1 Claim, 7 Drawing Figures

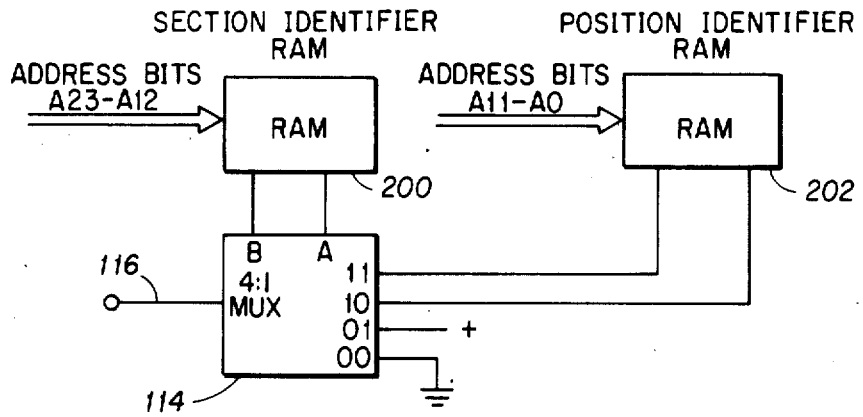
FIG 4
FIG 5
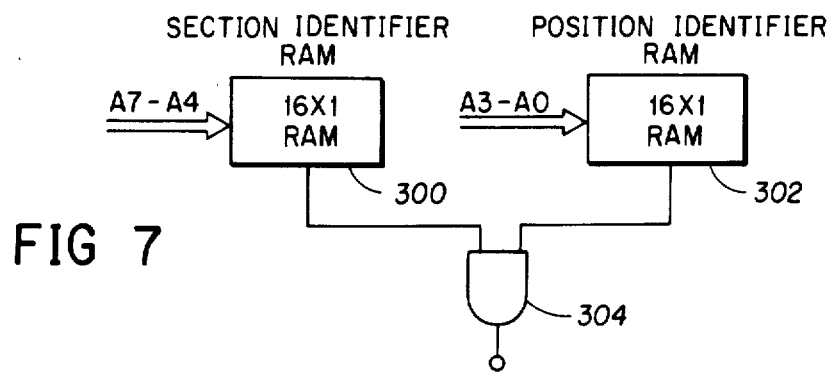
FIG 6
FIG 7

ADDRESS RANGE COMPARISON SYSTEM USING MULTIPLEXER FOR DETECTION OF RANGE IDENTIFIER BITS STORED IN DEDICATED RAM'S

This application is a continuation of application Ser. No. 453,193 filed Dec. 27, 1982, now abandoned.

BACKGROUND OF THE INVENTION

The present invention relates to digital decoding techniques, and more particularly, to a system and technique for comparing digital addresses or data to determine their position within a range or multiple ranges within a digital memory.

In digital systems, it is often desirable to know when a particular location has been addressed within memory. In computer programming and debugging systems in particular, data is often stored in particular areas of a memory device and the addressing of those areas at appropriate times is a very good indication that the computer system is properly operating. If the hardware or programming for some reason is not operating correctly, or there is a software error which has previously not been detected, the system may address a particular location (address) in memory within a range of addresses at a time when it should not have occurred. If this is detected, the signal can be used to advise an operator that an error has occurred.

The ability to determine computer addressing with respect to a particular range of addresses can be used to accomplish a variety of tasks in computer operation and development systems. By way of example, such indications may be employed to accomplish write protection, and to protect inadvertent addressing of memory areas specifically designated as read-only. If any address within a read-only memory, for example, is selected during computer operation, (by comparison of the selected address with the range of addresses defining the protected memory area), the computer can be stopped and a signal generated so that an operator might quickly determine why and at what point in the program of operation the machine or software error occurred.

In other instances, the knowledge of the range of any address selected may be used to indicate a software error or system error when the machine operates in a memory area defined by ranges outside of the one in which it should be during any time period. If the computer begins addressing memory locations at other than the appropriate ranges, a software error or signal flag can be provided. This again allows an operator to check the programming to determine why an error occurred.

In still other instances, systems often include multiple coupled machines which transfer, read, and exchange data from the same memory areas at different times. When such multiple addressing occurs, it is often desirable to know which machine is addressing particular memory locations at any given time. Again, this is necessary to control the access of the multiple machines and to determine if the proper machines are addressing the proper memory locations in accordance with that program control. Accordingly, if the selected addresses are compared with those addresses defining the memory ranges at any given time, the proper operation of the entire system can be followed and confirmed, or an error signal can be provided if an improper range is addressed by any of the multiple machines.

In yet other instances, the computer programming may include different loops which provide machine control. Commonly, the machine will operate within a specific loop for a given period of time before returning and following other branches of a program. It is often important to determine when the computer exits a specific address area defining the loop, so that a loop exit signal can be generated to signify the end of the loop or subroutine. Again, by making a comparison of the addresses selected during the operation of a loop, an operator can determine when the machine addresses other than the specific range of memory locations defining the loop.

In order to obtain the desired result in all of the above instances, each address selected by the computer during its operation must be compared with the end points of a given range of addresses to determine whether the selected address is inside, outside, or at an end point of that range. In the prior art, such comparisons have usually been made by using multiple comparator circuits which individually compare each selected address with the fixed end points of the range. In this manner, a signal can be generated to indicate whether the selected address is less than, equal to, or greater than the two end points. These signals can then be coupled to appropriate decoding circuitry and an output provided when a match occurs for the appropriately selected criteria. In implementing such a scheme, however, much hardware is required to store the particular end points of a range and to compare those end points with all digital addresses. In addition, as the number of bits in each address increases, so does the need for more hardware to make the required comparisons and decoding. Naturally, such increased hardware increases the cost and complexity of the system.

Accordingly, the present invention has been developed to overcome the specific shortcomings of the above known and similar techniques, and to provide a multirange comparison system and technique for enabling a simplified determination of the position of digital addresses or data with respect to a particular range of addresses or data.

SUMMARY OF THE INVENTION

In accordance with the present invention, an entire address or data space is divided into a predetermined number of sections defined by a first predetermined number of digits of the address or data. The position of an address or data within each section is also defined by a second predetermined number of digits of the address or data. Each section and each position within a section is defined by the association of section and position identifiers with an address such that the section identifiers are stored in a first memory and the position identifiers are stored in a second memory. For a given range comparison, the selected address or data causes the output of the section identifier and a position identifier which are in turn coupled to a multiplexing device. The multiplexing device is designed to provide an output which may, for example, indicate that the selected address or data is totally within the range, totally outside the range, or at one of the end points. When a match with one of the end points is made, the multiplexer automatically provides a signal identifying the end point as the lower or upper (starting or ending) end point. The identifiers may be selected and the memory devices fixed so that a signal is generated only when the address or data falls outside of the range or at the end points of the range if so desired.

It is therefore a feature of the invention to provide a simplified technique for comparing and determining the position of selected addresses or data within a range of addresses or data.

Another feature of the invention is to provide a digital decoding technique which reduces the hardware required for determining the position of addresses or data within a range of digital addresses or data.

Still another feature of the invention is to provide a multiple range comparison technique which identifies the position of selected addresses or data as within, outside, or at one of the end points of a predetermined range or plurality of predetermined ranges.

A further feature of the invention is to provide a comparison of addresses or data with respect to a predetermined range of addresses or data using only two storage devices and a multiplexer for each comparison channel.

Yet another feature of the invention is to provide a technique for comparing the position of selected addresses or data within a range which may be easily defined and altered by modifying identifiers in storage devices.

These and other advantages and novel features of the invention will become apparent from the following detailed description when considered with the accompanying drawings wherein:

BRIEF DESCRIPTION OF THE DRAWINGS

FIG. 4 is a schematic illustration representing the section identifiers located in the first memory device in FIG. 3 for determining the position of a selected address relative to the predetermined number of sections.

FIG. 5 is a schematic diagram illustrating the position identifiers assigned in the second memory device of FIG. 3 for determining the upper and the lower end points of an address within a specific section.

FIG. 6 is a block diagram showing one channel of a range comparison technique using an increased number of bits.

FIG. 7 is a schematic block diagram showing a simplified version of the system of FIG. 3 for determining the match of a selected aodress to a specific address within the range.

DETAILED DESCRIPTON OF A PREFERRED EMBODIMENT

Figure 1:
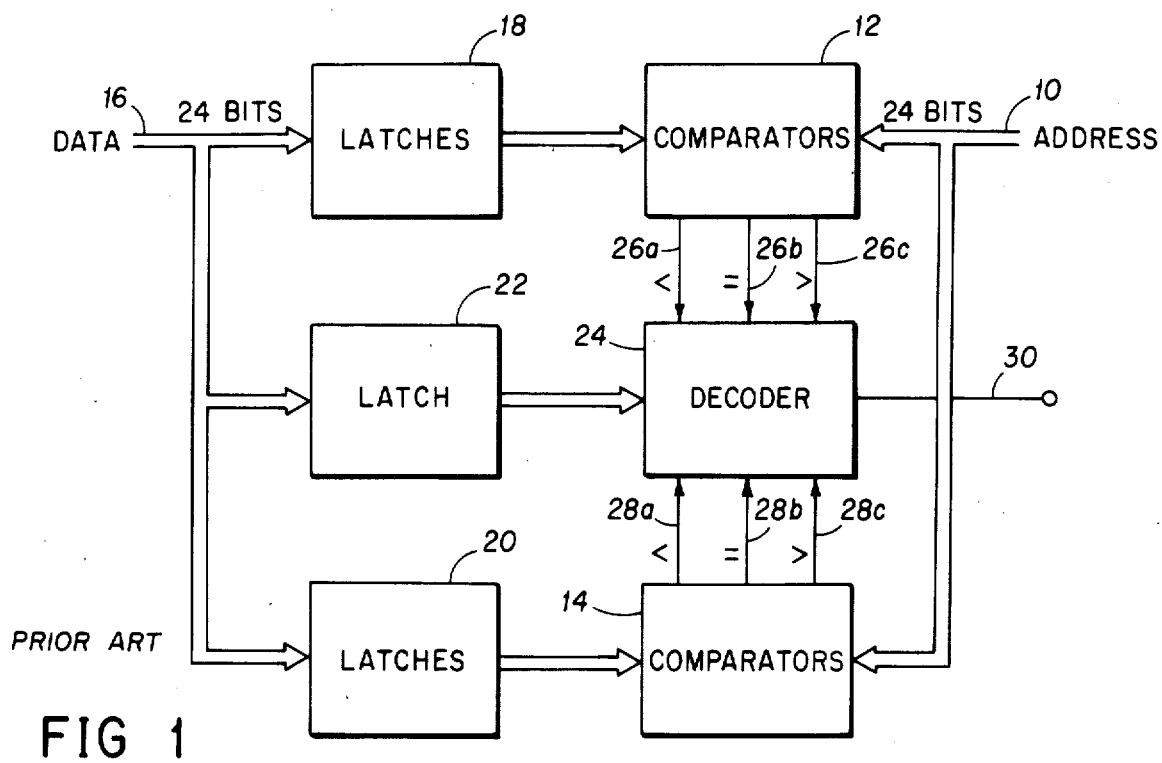
FIG. 1 is a block diagram showing a prior known implementation of an address range comparison channel.

Referring first to FIG. 1, there is shown a schematic block diagram of a prior known system and technique for comparing selected addresses with respect to a given range of addresses in order to make a determination of the position of that address relative to the end points of that range. It should be noted, that although the present system and technique will be described with respect to range comparison of digital addresses, it is equally applicable to the range comparison of data. In this example, a selected address to be compared is provided at 10 which, in this instance, is illustrated as a 24-bit address. The address is provided to comparators 12 and 14 as one input thereto. At the same time, data is provided at 16 which defines a desired range of addresses including the end points of that range. The data from 16 is provided to digital latches 18 and 20 each of which stores one of the end points of the range. The data from 16 is also provided to latch 22 to store the selection criteria needed to define the selected address as within, without, or at one of the end points of the range. Output from the latch 18 is provided as a second input to the comparator 12 while output from the latch 20 is provided as a second input to the comparator 14. The output from the latch 22 is provided to decoding circuitry 24 which also receives input over lines 26a, 26b, and 26c from comparator 12 as well as input from lines 28a, 28b, and 28c from comparator 14. In order to make the required matches for a selected address defined by 24 bits, the hardware required for the above structure of FIG. 1 usually includes three chips for each latch 18 and 20, six chips for each comparator 12 and 14, and three to four chips for the latch 22 and decoder 24.

As is known and as will be understood with respect to FIG. 1, the selected address from 10 is compared with one of the end points from latch 18 in comparator 12 to produce one of three state indications on the three output lines 26a, 26b or 26c. The indicated state identifies the selected address from 10 as less than the end point (26a), equal to the end point (26b), or greater than the end point (26c). In a similar manner, the selected address from 10 is compared to the second end point of the range from latch 20 in comparator 14 to produce one of the same three state indications on output lines 28a, 28b, or 28c; that is, the selected address from 10 is either less than the second end point (28a), equal to the second end point (28b), or greater than the second end point (28c). Each of the state indications from the comparators 12 and 14 are then provided as input to the decoder circuit 24 which may then provide an output on line 30 depending on the criteria determined by latch 22.

As will be seen, using the outputs from comparators 12 and 14, the position of the address 10 can be fixed as inside, outside, or at one of the end points. The primary disadvantage of this technique, however, is the need to use a large number of circuit chips to implement the comparison and decoding. In systems using multiple ranges or more than one criteria for selecting addresses with respect to given ranges, it will be seen that multiple channels may be required to produce the necessary indications. As the number of channels increase, so does the number of circuit chips necessary to provide the appropriate comparisons and thus, the cost and complexity of the system. Likewise, as the number of bits in the address increases, a corresponding increase in the number of circuit chips is also necessary to produce the comparisons.

In order to reduce the complexity, and accordingly, the cost of such systems and techniques for identifying selected addresses within predetermined ranges, and in order to provide a technique for easily changing the end points to define new ranges, the present invention divides the memory space into a plurality of sections. By way of example, and referring specifically to FIG. 2, one embodiment of the present invention will be described with reference specifically to an address defined by 8 bits which accommodates a memory space of 256 addresses. Although the invention will be described with respect to the use of an 8-bit number to represent each discrete address, it will be apparent that the same technique and structure may accommodate an address (and associated memory space) defined by any number of bits. Accordingly the specific example is not meant to restrict the teachings of the present invention to only an 8-bit address and 256 address memory.

Figure 2:
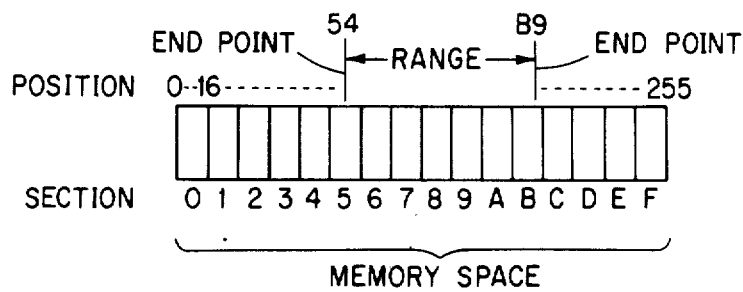
FIG. 2 is a schematic illustration of a memory space divided into a predetermined number of sections and indicating a range within those sections.

Referring to FIG. 2, when using addresses identified with 8 bits, a total of 256 memory locations may be defined where each address is defined by a distinct 8-bit digital value. Using the 8-bit digital value, the first 4 bits of that digital value may be used to separate the 256 locations (addresses) of memory (0–255, hexidecimal in FIG. 2) into sixteen separate sections (0 through F in FIG. 2), each section defined by a unique 4-bit digital value represented by the first four bits of an address. Likewise, each of the sixteen sections will include sixteen addresses (positions) within each section which is uniquely defined by the second four bits of the 8-bit digital value. As is known, the first four bits are conventionally identified as A7 through A4 and the second four bits are identified as A3 through A0. In the present example, to be described, the range defined for comparison with the selected addresses is fixed to have end points at locations 54 and B9 within the 256 position memory space.

Figure 3:
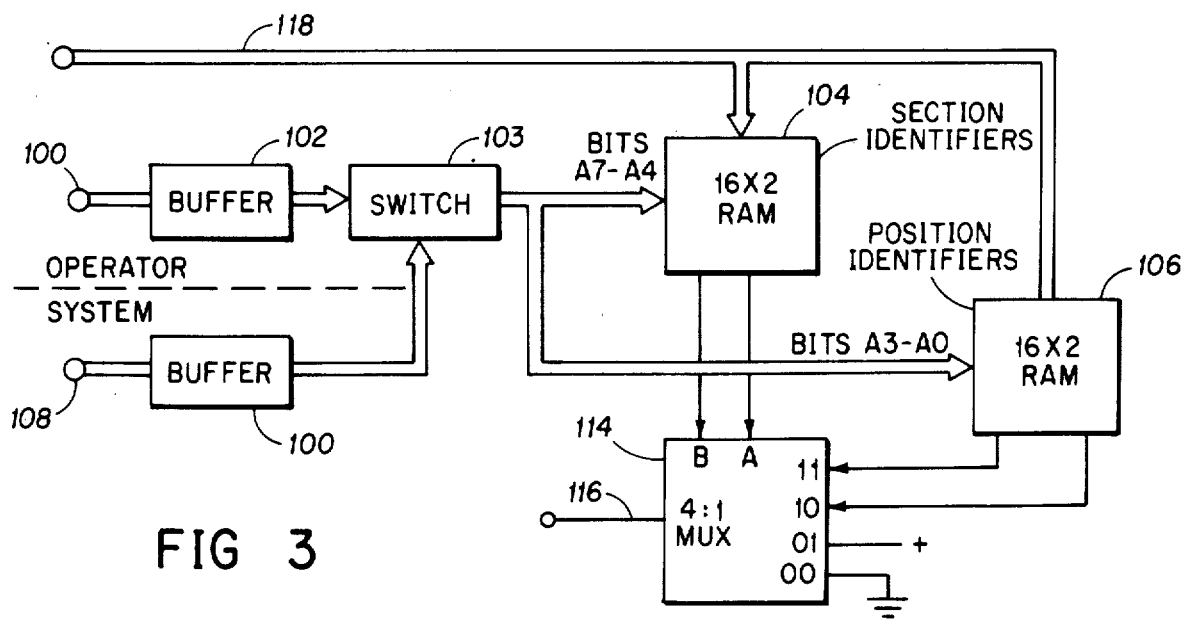
FIG. 3 is a schematic illustration of one channel of a range comparison system in accordance with the present invention.

Referring now to FIG. 3, there is shown the system which provides the comparison in accordance with the present invention. The system generally includes an operator selected input 100 which provides addresses to a buffer 102 and thence as output through a switch (or multiplexer) 103 wherein the first four digits A7–A4 are provided as input to a first memory device 104 while the second four digits A3–A0 are provided to a second memory device 106. The computer system, with which the invention may be used, provides input of selected addresses at 108 to a buffer 110 which has its output coupled through switch 103 as input to the memory devices 104 and 106 in the same manner as the output from the buffer 102. The operator may then control the coupling of the outputs from 102 and 110, (by use of switch 103) to the memory devices 104 and 106 for controlling the entry of the identifiers association of identifiers with addresses defining the range prior to comparison with the system selected addresses, all as will be subsequently described.

In the present example, the memory devices 104 and 106 may be conventional random access memory (RAM) devices and in the present instance, will be defined as a 16-position-long by 2-bit-wide RAM. Each of the RAMs 104 and 106 have two outputs which couple each of the 2-bits (each of the sixteen RAM positions) as input to a multiplexer 114, one bit at input B and the other at input A. Referring to FIGS. 4 and 5, if the sixteen positions in RAM 104 are uniquely defined by the four address bits A7–A4, then each of the sixteen, 2-bit wide positions will include a specific bit pattern represented by the denoted bit 1 and bit 0 designations in FIG. 4. Bit 1 is provided as input to terminal B of the multiplexer 114 and bit 0 is provided as input to terminal A of the multiplexer 114. In a similar manner, for each of the address positions defined by the bits A3–A0 in the RAM 106, the sixteen, 2-bit positions are defined as the bit 1 and bit 0 positions in FIG. 5. The bit 1 position is associated with the upper (ending) end point (B9) for the selected section and the bit-0 position is associated with the lower (starting) end point (54) for the selected section as will be described further below.

Now, referring again to FIG. 4, and understanding that each of the sixteen positions defined by the first four bits (A7–A4) of the address represent one of the sixteen sections of memory space, the bit pattern in the RAM 104 may be used to establish section identifiers association of section identifiers with addresses indicating that the section is either outside the desired range, inside the desired range, or contains an end point of the desired range. Each of the 2-bit positions of the RAM 104 are used to establish 2-bit identifiers indicating the position of the sections with respect to the range. In the present example, the identifiers are established such that a 2-bit identifier 00 represents a section outside of the range fixed in FIG. 1; a 2-bit identifier 01 represents a section within the range fixed in FIG. 1; a 2-bit identifier 10 represents the section that includes the starting end point (position) of the range; and a 2-bit identifier 11 represents the section that includes the ending end point (position) of the range.

In a like manner, the sixteen positions fixed by the RAM 106 and defined uniquely by the second four address digits A3–A0, represent the address location (position) and the 2-bit identifiers in RAM 106 association of position identifiers with addresses identify the position within a section as being the starting end point or the ending end point. In FIG. 5, the bit-1 position is coded to have a 1 output when the address is less than the ending end point and therefore within the range, while the bit 0 position is coded to have a 1 output when the address is greater than the starting point and therefore within the range.

Using the above identifiers, and the input of the identifying bits from each RAM 104 and 106, the multiplexer is operated to provide an output indicating when a selected address is within or outside of the selected range. In the present instance, when the identifier bits received at the B and A inputs to multiplexer 114 are 0, the multiplexer is constructed to couple the 00 input (which is grounded to represent a digital 0) to its output 116. When this occurs, the indication from 116 shows that the selected address is outside of the range. When the identifier bits received at the input B and A of the multiplexer 114 are 0 and 1, respectively, the multiplexer is constructed to couple the 01 input (which is coupled to voltage level representing a digital 1) to the output 116 and thus indicate that the position of the address is within the range.

When the identifier inputs to the multiplexer 114 at B and A are 1 and 0, respectively, indicating the starting section of the range, the starting bit output (bit-0) from RAM 106 is coupled as input to the 10 terminal of multiplexer 114 and thence as output on 116. Thereafter, when a digital 1 appears in that bit position (the bit-0 position of RAM 106), it will be coupled as output on 116 representing the position of the selected address as greater than the starting point of the range and thus within the selected range. Likewise, when the identifiers received at inputs B and A of 114 are 1 and 1, respectively, the multiplexer couples its input 11 to the output 116 and the ending bit output (bit-1) of the RAM 106 is coupled as input to the 11 terminal of multiplexer 114 representing the end point of the selected range. Again, as long as a 1 is provided as output from the bit 1 position of RAM 106, the output on 116 from multiplexer 114 will be a digital 1 indicating that the selected address is less than the ending end point and therefore within the selected range. When that same bit 1 position turns to a digital 0, the output from 116 is again a 0 representing that the selected address is outside of the range.

With the above configuration, it can be seen that for any selected address the RAM 104 uniquely decodes the sixteen sections using the 2-bit section identifiers to immediately determine the position of any address within any of those sections as being outside of the range, inside the range or at one of the two end points. When a selected address is in a section outside the range, the signal at 116 makes that immediate indication. Likewise, when a selected address is in a section within the range but not in a section containing one of the end points, the output at 116 immediately makes that indication. Finally, when the selected address is in one of the sections containing an end point as designated by the output from 104, then the position identifiers associated with the second four digits of the address (A3-A0) in RAM 106 designate the particular address within the section as being less than or greater than the starting and ending end point and further indicate at the output 116, that the address is within the desired range, or outside of that desired range. As will be apparent from the above description, the above comparison can be made simply with, as noted in this one example, two sixteen-by-two RAMs and a 4:1 multiplexer. This significantly reduces the required circuitry for providing a comparison of address position with respect to a predetermined range.

In order to insert the identifiers into the RAMs 104 and 106, the system may be operated to multiplex operator input with the normal system addressing. In this instance, multiplexer (or switch) 103 could be selected by the operator to address the sections and positions within the sections where the end points are located. Thus, for example, each of the sixteen sections would be identified by the sixteen positions in RAM 104 as determined by the A7-A4 bits. As each section is addressed by the operator through input 100, the section identifiers could be entered into the 2-bit wide positions in RAM 104 positions through data line 118, thereby establishing the 2-bit pattern at each of the 16 positions in RAM 104 representing a section as noted in FIG. 4.

In a like manner, the position identifiers could also be entered into the 2-bit-wide positions in RAM 106 thereby establishing the 2-bit pattern in RAM 106 which identifies the address end points of FIG. 5. Once this data is entered, the multiplexer 103 can then be used to couple the system addresses at 108 to the RAMs 104 and 106. Thereafter, whenever an address appears as input at 108, and thence as output from the buffer 110, that address will be decoded by RAMs 104, 106 and multiplexer 114 to provide an indication at the output of the multiplexer 116 indicating whether the selected address at 108 is within or outside of the selected range. This is accomplished automatically and with a significant decrease in the amount of hardware required for comparing and decoding the address in contrast to that of the prior art. Once the information has been entered by the operator at input 100 and 118, it may easily be changed by again multiplexing those inputs through 103 to redefine the bit patterns in RAMs 104 and 106. It will thus be understood that the exemplary structure of FIG. 3 allows a very versatile system for easily selecting and modifying a range for comparison with selected addresses.

While the above example was described with respect to an 8-bit digital value defining the address, it will be apparent that any number of bits may be used to define a memory space. By way of example, FIG. 6 shows parts of a similar system employing a 24-bit digital address representing a memory space of $(4096)^2$ addresses. In this instance, the first twelve bits (A23-A12) of a selected address are provided to a RAM 200 having 4096-positions by two bits-wide (4K × 2) and the second twelve bits of a selected address (A11-A0) are provided to a RAM 202 having 4096 positions by two-bits-wide (4K × 2). The outputs from the RAMs are connected to a multiplexer 114 in the same manner as with respect to FIG. 3. Again, the outputs indicate whether the address falls within or outside of the range without significant comparator circuitry. It will thus be apparent that the technique can be applied to an address having any number of bits necessary to define a memory space of any selected size. In the event that it is desired to compare multiple ranges to determine the position of a selected address with respect to each of those multiple ranges, a plurality of separate channels may be used. Each channel would then include a configuration similar to FIG. 3 for each range. Other configuratons of RAMs may enable the number of separate channels to be reduced, given that certain constraints are observed in increasing the multiplexing capability. Naturally, the bit pattern set by FIGS. 4 and 5 can be changed to obtain outside range matching by reversing the inside/outside identifiers and by inverting the comparison pattern. This again further increases the versatility of the comparison technique.

In one specific example of the invention, a further simplification of the structure may be made when only one address comprises the range. In this instance, as shown in FIG. 7, the section identifier RAM 300 needs only one bit to identify the section as being outside or containing the selected address. In a similar manner, the position identifier RAM 302 needs only one bit to identify the specific address within the section as being at the selected address position, or not at the selected address position. In each RAM, this can be accomplished with a digital 1 used for the match condition and a digital 0 used for a nonmatch condition. The outputs of the RAMs can then be tied to an AND-gate 304 and that AND-gate provided as the output indicating a match or no match. Until the 1 in both the first and second RAMs is provided as an input to the AND-gate 304, the output from that AND-gate will represent that any selected address is not matched. However, when the output from the RAM 300 and the RAM 302 are both 1's, then the output from the AND-gate 304 will also be a 1, indicating that the selected address matches the range address. This significantly simplifies the use of the RAMs and eliminates the need for a multiplexer to obtain the match for a selected address. Naturally, this could be extended to any number of digits and any number of channels to selectively match addresses to those desired. Obviously, the AND-gate function could also be performed using a conventional wired-OR technique.

As can be seen from the above disclosure, the present invention allows the comparison of selected digital addresses with a predetermined range or predetermined address to determine its position with respect to that range or address. This is accomplished using simple and inexpensive storage devices and multiplexers having significantly less circuit requirements than prior known techniques. The present system allows multiple channels of various bit-lengths to be constructed and provides great versatility by enabling easy selection and modifications of the range and end points defining the range. This significantly reduces the time and circuitry necessary to handle large processing tasks and thereby facilitates increased software and system control. These are all advantages and features that have been unrecognized by the prior art.

While the above technique has been described with respect to particular structure and address comparisons, it is apparent that other equivalent devices could be used to accomplish the same purposes. It will also be apparent that the technique is applicable to data comparison where individual values of data may be selectively determined to fall within, outside, or at the end points of specific ranges of data. In such instances, the large bit-widths often encountered in processing data can be handled without the normally required cost and complexity of the circuitry needed to make such comparisons.

Obviously, many other variations and modifications of the present technique are possible in light of the above teachings. It is therefore to be understood that within the scope of the appended claims, the invention may be practiced otherwise than as specifically described.

What is claimed is:

1. A system for comparing the position of a digital address with respect to a range of digital addresses comprising:

means for storing data within a memory space defined by a predetermined number of digital addresses wherein each address is defined by a unique combination of a predetermined number of digital bits;

means for dividing said memory space into a plurality of sections wheein each section contains a plurality of said addresses and each section is defined by one portion of said predetermined number of bits and wherein the position of each address within a section is defined by another portion of said predetermined number of bits;

first means responsive to said one portion of said predetermined number of bits for establishing a section identifier for each section to define the position of said section with respect to a predetermined range of digital addresses having upper and lower end point addresses within said memory space, wherein said first means for establishing section identifiers comprises an N-by-2 RAM wherein N equals the number of sections and each identifier is represented by a 2-bit digital pattern defining each section;

second means responsive to said portion of said perdetermined number of bits for establishing position identifiers for each address within a section containing an end point address of said range, wherein said second means for establishing position identifiers comprises an M-by-2 bit RAM wherein M equals the number of addresses within each end point section and one of the bits of the M-by-2 RAM contains a digit forming the position identifier defining the position of each address within an end point section relative to the lower end point of said range, and the other of said bits of the M-by-2 RAM contains a digit forming the position identifier defining the position of each address within an end point section relative to the upper end point of said range;

means for selecting a data input having an address defined by section and position identifiers; and means for detecting the identifiers defining said selected address to determine the position of the selected address relative to said range, wherein said means for detecting comprises a multiplexer constructed to have inputs which receive the 2-bit identifiers from each of said first and second means in response to a selected address for providing an output representing the position of said address relative to said range, said multiplexer being constructed to provided a first output in response to said section identifiers when a selected address falls outside of said range, provide a second output in response to a section identifier when a selected address falls within said range, provide a third output in response to a position identifier when a selected address falls within a section containing a lower end point of said range, and provide a fourth output in response to a position identifier when a selected address falls within a section containing an upper end point of said range.

* * * * *